US008881195B2

(12) United States Patent
Clements

(10) Patent No.: US 8,881,195 B2
(45) Date of Patent: Nov. 4, 2014

(54) TEST SYSTEM FOR A SET-TOP BOX

(75) Inventor: Stephen Clements, Dublin (IE)

(73) Assignee: S3 Research and Development Limited, Dublin (IE)

( * ) Notice: Subject to any disclaimer, the term of this patent is extended or adjusted under 35 U.S.C. 154(b) by 527 days.

(21) Appl. No.: 13/322,146

(22) PCT Filed: May 24, 2010

(86) PCT No.: PCT/EP2010/057094
§ 371 (c)(1),
(2), (4) Date: Feb. 6, 2012

(87) PCT Pub. No.: WO2010/133699
PCT Pub. Date: Nov. 25, 2010

(65) Prior Publication Data
US 2012/0140081 A1 Jun. 7, 2012

(30) Foreign Application Priority Data

May 22, 2009 (GB) .................................. 0908872.5

(51) Int. Cl.
*H04N 5/445* (2011.01)
*H04N 17/04* (2006.01)
*H04N 17/00* (2006.01)
(52) U.S. Cl.
CPC ............. *H04N 17/04* (2013.01); *H04N 17/004* (2013.01)
USPC ............. 725/37; 725/135; 725/139; 725/143; 725/151

(58) Field of Classification Search
None
See application file for complete search history.

(56) References Cited

U.S. PATENT DOCUMENTS

| 7,113,880 B1 | 9/2006 | Rhea et al. |
|---|---|---|
| 7,155,653 B2 | 12/2006 | Monnerat |
| 7,519,864 B2 | 4/2009 | Alam et al. |
| 2004/0187167 A1* | 9/2004 | Maguire et al. ............... 725/135 |

FOREIGN PATENT DOCUMENTS

EP    1397001    3/2004

OTHER PUBLICATIONS

"Overview of AvsP," Internet Citation, Oct. 27, 2007, http://avisynth.org/qwerpoi/Overview.htm (Oct. 27, 2007).
T. Djajadiningrat, "Satimage's Smile," Internet Citation, Jan. 1, 2000, http://www.mactech.com/articles/mactech/Vol.16/16/10/SatimagesSmile/index.html (Jan. 1, 2001).

* cited by examiner

*Primary Examiner* — Nicholas Corbo
(74) *Attorney, Agent, or Firm* — Patrick J. S. Inouye; Krista A. Wittman

(57) ABSTRACT

The present application is directed to a test system for testing set-top boxes which provide a video output to a television. The test system records the execution of a test script, inputs to the set-top box and video output, each separately with a time stamp. The test system has a graphical user interface for playing back the video, inputs and scripts in a synchronised fashion.

20 Claims, 2 Drawing Sheets

TEST SYSTEM FOR A SET-TOP BOX

BACKGROUND

In the field of electronics generally, it is customary to test devices as a part of the manufacturing processes. Such testing is used to ensure that defective products are not sold to customers.

One type of device that requires extensive testing is a set-top box (STB). STBs are devices that allow televisions to display content which the television is not configured to display directly. STBs may provide basic decoding or more advanced features including, for example, the ability to record content. These STBs are typically controlled using an infra red remote control.

A typical test procedure for a set-top box is therefore for a test person to perform a prescribed list of tests, each test involving the sending of commands to the STB (typically either using infra red remote control commands or serial interface commands) and visually comparing what the output on the TV (text, video, and audio) is compared to what was expected.

Automated systems are known for performing these types of tests generally in which a test script is written on an electronic testing system to implement the test procedure. This testing system sends signals to the remote control input or the serial interface input of the STB; the video and audio response is captured and compared against expected results. Video capture also allows for Optical Character Recognition (OCR) processing and therefore text on the screen may also be included in the test. Since these tests are fully automated, the tests can be left running unattended for long periods of time.

Whilst these test systems improve productivity by virtue of the automation of the test, failures can be time consuming to analyse. The present application is directed at improving this subsequent analysis of the failure.

SUMMARY

The present application improves the analysis of test results by allowing a user to review a conducted test on a Device Under Test (DUT) in a manner where they can easily jump to any point in a conducted test, and whereby the inputs to the DUT and the outputs from the DUT are displayed in a synchronised fashion. This allows for a user to jump to a failure and review the input and outputs at the time of the failure or immediately before it.

More particularly, the present application provides a system in accordance with the claims which follow.

DETAILED DESCRIPTION OF DRAWINGS

Figure 1:
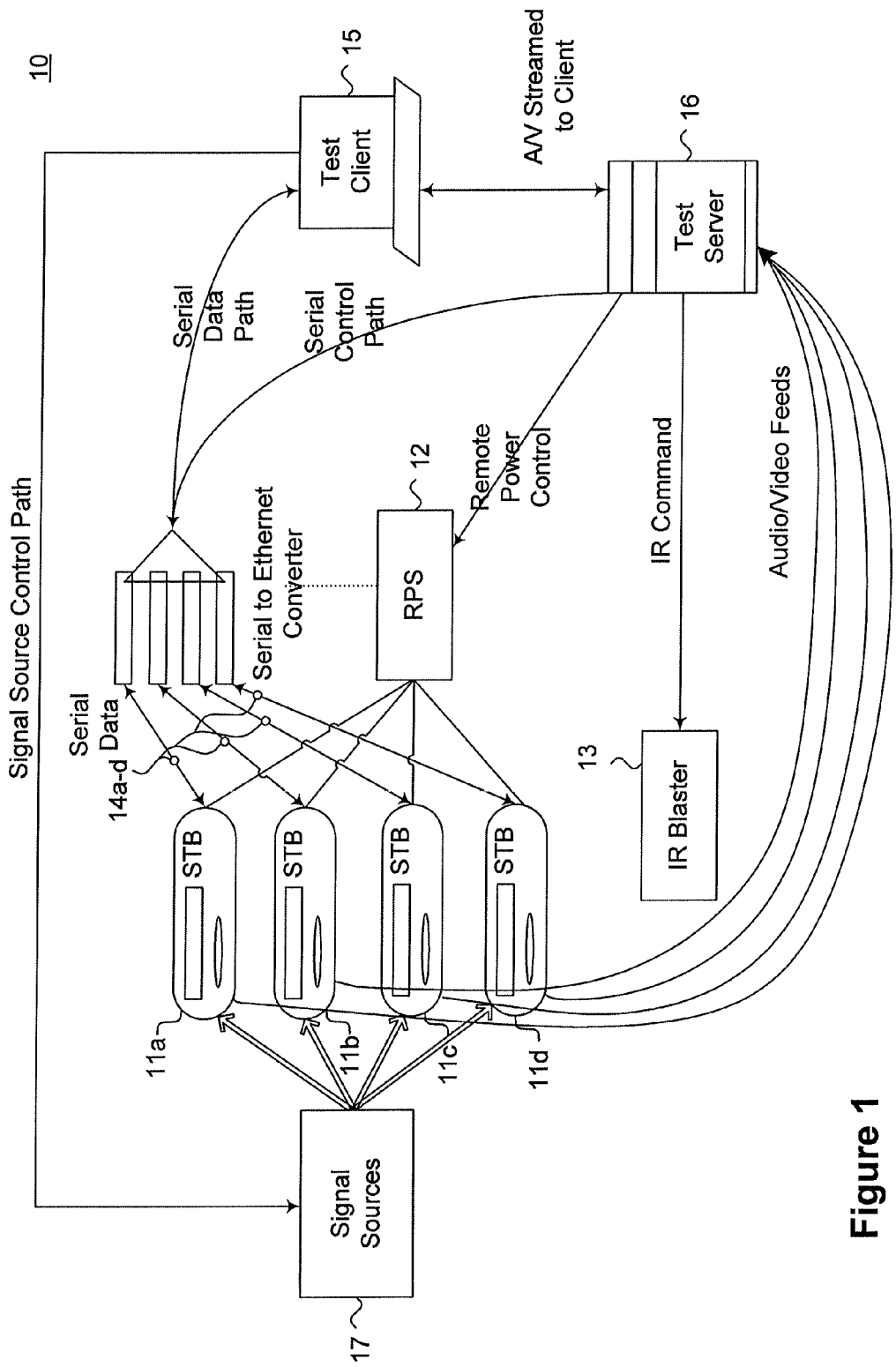
FIG. 1 is a block diagram showing the elements of a system according to an embodiment of the present application.

As shown in FIG. 1, the present application provides a test system for testing a set-top box or similar device. As explained above set-top boxes are employed to provide allow televisions to display audiovisual content which televisions would not generally be configured to display directly. A basic function of set-top boxes is to decode digital information received from a content provider, for example via cable or satellite, and convert this into audio and visual signals which the television can display. The functionality of set-top boxes has increased in recent years and as result, the complexity of these devices has also increased. A result of this increased complexity is that the testing performed on set-top boxes to ensure they are functioning correctly has also increased. The test system of FIG. 1 is suitable for performing such tests. Moreover, whilst it performs the test in a similar manner to the prior art, it dramatically improves the speed of reviewing results where a failure has been found and as result improves the productivity of test centres. The system as would be familiar to those skilled in the art operates in a test client-test server configuration. The test system allows for the full control of the devices under test (STBs) by means of a number of different interfaces including for example a power controller (RPS) which can switch power on\off on each of the STB's. An IR blaster may be provided to provide infra red remote control signals to the individual STBs. Similarly, serial data may be sent to or from the STB's. The Test client acts as a signal source for the STB as a feed from a satellite receiver or cable network would in normal operation.

The system may be considered generally to comprise a memory and a controller. The memory is employed to store test scripts and results obtained. The concept of test scripts and their use will be familiar to those skilled in the art. In their most basic form they are a sequential list of instructions to be sent to a device under test (DUT). Techniques for performing this will be appreciated and familiar to those skilled in the art, for example a scripting language, such as Phython, may be employed. Other test systems employing any other script language such as e.g. Visual Basic, Ruby, proprietary languages etc May also be employed.

They may also comprise an expected result from the DUT. The controller is configured to execute the test scripts and to monitor and store the results in memory. As explained above, the system comprises a control interface which may be employed to provide an input to the device under test (STBs). The input may be the previously described serial connection into the DUT or an infra-red signal from a remote control (IR blaster) directed at the IR receiver of the DUT.

The system further comprises, suitably within the server, a recording means for recording the responses from the DUT to the test script on one or more outputs. In the case of the video output, the recording means may comprise an interface receiving the video output from the DUT and storing the video in the memory. Alternatively, the video output from the DUT may be connected to a television and a camera employed to capture the output. In either case, the system is configured so that video recording is synchronised to the start of the test script. An optical character recognition module may be employed to identify the text content within individual frames of the video. This text content may be employed by the controller to determine whether a particular test has executed correctly, e.g. by determining whether a predicted word appeared or not. The text content may be stored with the video content as metadata. Suitably, the text content is stored in linked fashion to the individual video frames. This may be by means of an explicit reference\link to a particular frame in the video sequence or by means of a timestamp identifying the time of the frame. An audio output may also be recorded from the DUT as a separate item or as a component of a combined AV recording. Other outputs from the DUT which may also be captured include for example but are not limited to, serial connection output data or Ethernet connection output data or various other custom output connections for the relay of debug and status information from inside the DUT to outside monitoring systems.

The system may automatically start the script after a DUT has been connected to the test system. Alternatively, a test script may be initiated in response to a user input. In either case, the recording means is triggered at the same time. Scripts are sequential in nature, thus the controller will execute each command of the script in sequence. As the controller arrives at or executes a command, a time stamp is recorded against the command to identify when the command was executed. As with the text above, the time stamps may be explicit or implicit, i.e. referenced for example to a particular frame in the video sequence. As each test within the script is executed, the controller may store the result within a result log, the log may be a simple text file with the name of the test and the result, e.g. "PASS" or "FAIL". Each element within the log file may be time stamped to allow for the correlation of the test input with the test output.

Figure 2:
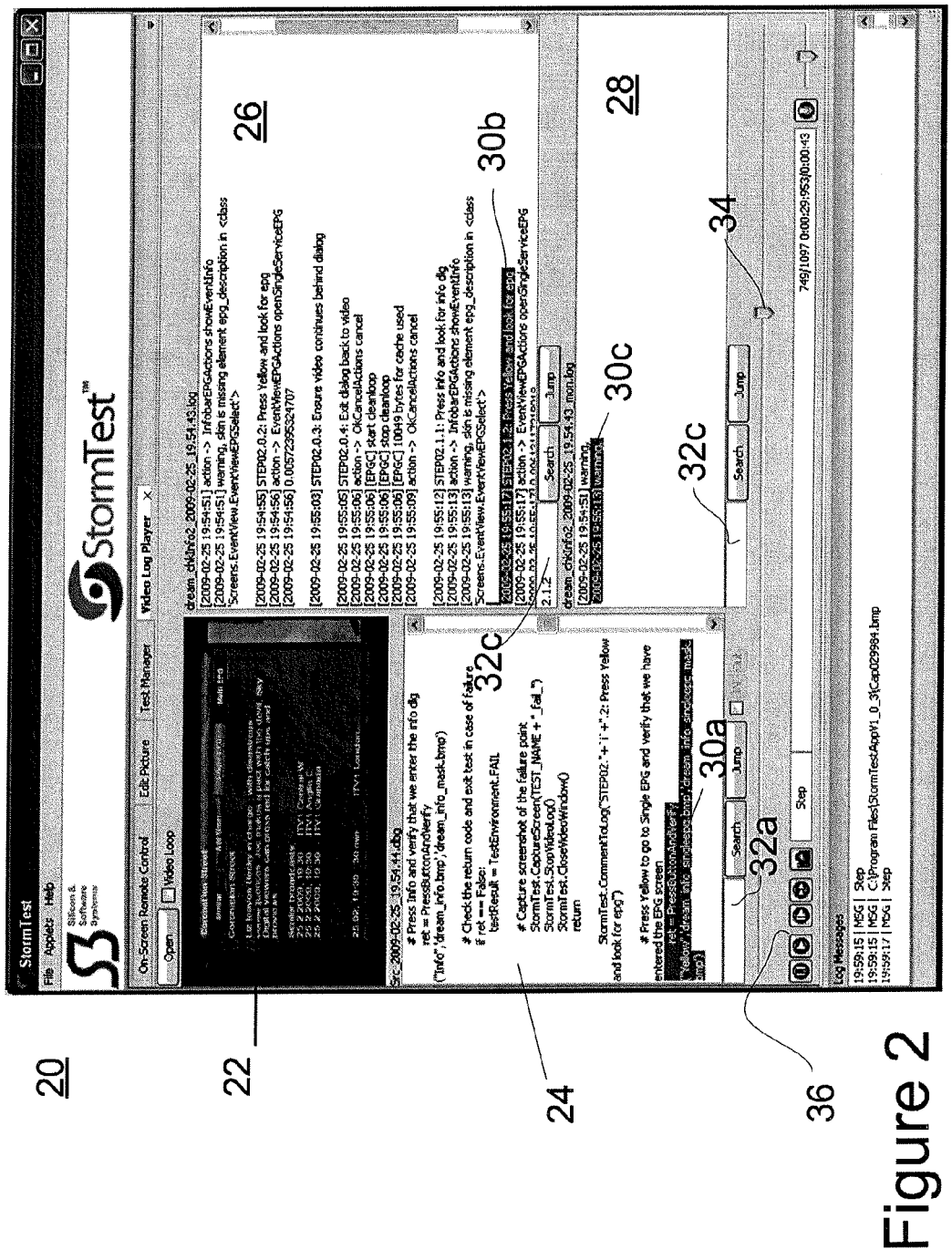
FIG. 2 is a screenshot illustrating some exemplary output for a graphical user interface employed with the system of FIG. 1

A playback means is provided to allow a user to playback the test and the results. The use of this playback means allows a user to leave a test script running until completion and then to review the test subsequently where an error has occurred. The playback means includes a graphical user interface 20, as illustrated in FIG. 2, having a plurality of playback windows 22, 24, 26 and 28. Whilst each window displays separate data, the playback means is configured to ensure that the information in each window is synchronised with the other windows. For example, in a simplest form, a first window might display the test script 24 with a second window the recorded video 22. The display of the test script is not static and changes as the test is played back to highlight a particular section\line\command 30 of the script. As the position within the recorded test script changes so does the video in a synchronised fashion.

A further window which is suitably also synchronised may display the test log 26. Another window 28 may contain warning or error messages that have been generated during the test, again where each warning or error message is timestamped.

Advantageously, a feature 32a-c may be provided within the playback means to allow a user to perform a text search on the content being displayed in an individual window. Where a search word is found, the playback means may highlight it in the individual window and at the same time bring the displays in the other windows into synchronisation with the highlighted word, e.g. by ensuring the time stamp of each window is consistent.

The word search may be configured to be performable on different windows as required. For example, the user may search for the name of a particular test in the test script window or a particular result in the log file.

Whilst a DUT may operate relatively slowly or quickly depending on the circumstances, the playback means is advantageously adapted to allow the user to alter the speed of playback. Thus where a particular result happens to quickly on the screen for the user to review it, the playback means may be slowed down. Similarly, where a DUT responds slowly, the user may accelerate the playback in order to identify faults\problems quicker. To allow the use to control this a plurality of buttons 36 are provided as might be found on a playback device such as a DVD player for playing, pausing, rewinding or fast forwarding.

Whilst any multiple is realisable, it will be appreciated that increasing\or decreasing the speed by a multiple of two is convenient from a calculation overhead.

To further assist the user, a slider 34 may be provided in the GUI to allow a user to move to a particular section of the recorded test in a manner which would be familiar to those skilled generally in the art of video playback.

Multiple DUT may be connected to the same test system, and controlled via a single test script. In this case the system may record multiple independent DUT outputs for each DUT under test, while maintaining a consistent timestamp timebase for all outputs. This allows detailed, automated analysis of the test results to be carried out after the test has completed.

In addition, the time stamping of the multiple independent output streams from each DUT allows the system to determine from the recorded data stream the precise picture presented on multiple DUT simultaneously, with much greater accuracy than is possible in real-time or by a human observer, and to relate this to the commands being sent to the DUT via IR or other means under the control of the test system. Thus it is possible to extract comparative performance measurements for different DUT with a high degree of accuracy by automatically analyzing the results of completed tests.

The recording of the complete data streams from the DUT with precise timestamp information further allows additional testing and analysis to be carried out on the stream, after the test has completed. For example, consider the case that an automated test sent a command to the DUT and verified that following reception of the command a blue screen was presented to the user for a defined period of time, and this is run this test for an extended period. The system records the various outputs from the DUT with timestamp integrity maintained. Now suppose that, following review of a portion of the test, the user decides that this test was insufficient and that a more complete test would be to present a blue screen, followed by a red screen.

Rather than re-running the test against the DUTs for an extended period of time, it is possible to replay the data captured from the DUT and execute a revised test against that replayed data stream, rather than against data being encoded live from a physical DUT. The speed of playback can be advantageously adapted to allow more detailed analysis of the recorded data to be carried out at slower than real-time speed, or to allow simpler analysis to be carried out at faster than real-time.

The system may also switch during analysis of a live data stream, from analysing the live data, to analysing the same data stream at some time in the past using the data stream currently being recorded, up to and including the point at which the test commenced. While the system is analysing the data from the recording, the live data can continue to be recorded to this same data stream, allowing the test script later jump back to the live recording while maintaining a complete recorded data stream from the DUT.

A recording means may also be provided to record the network data stream entering the DUT whether a broadcast, multicast or unicast signal. This data stream may also captured with precise timestamp information. With this, it is possible to deduce the data being delivered into the DUT synchronous with any point in the output data streams. This allows the user to recreate many of the conditions of the DUT at any time of interest in order to re-execute a test scenario from any point in time of interest. In typical use a user will identify a point of interest from reviewing the output data streams and will use this capture of the input data stream to begin re-executing the test from a point in time which is a useful period in advance of the time of the point of interest. It will be understood that the ability to produce such a recording of the input data stream is dependent on available storage space and sufficient recording processing power and receiver bandwidth in the case of broadcast signals of very large bandwidths.

The invention claimed is:

1. A computer-implemented test system for testing a device providing a video output for a television, comprising:
   a device under test configured to provide a video signal through a device output for a television and comprising a device input configured to allow control of the device under test by a user; and
   a test system comprising:
   a controller,
   a testing output from the controller configured to provide instructions to the device input of the device under test,
   a memory configured to store a test script comprising a sequence of test elements that each comprise at least one instruction that is configured to be sent to the device under test and an expected result that is expected to be received from the device under test in response to the at least one instruction,
   a recording means for recording the video signal provided through the device output,
   wherein the controller is configured to execute the test script and time stamp each test element of the script upon execution,
   playback means for playing back the test script in a script window of a graphical user interface and simultaneously playing back the recorded video signal in a video window,
   wherein the playback of the video signal and the test script are synchronized,
   wherein the test system produces a test log, the log identifying the result of each test element within the test script and wherein the playback means further plays back the test log in a third window, wherein the playback of the test log is synchronized with the recorded video signal and playing back of the test script.

2. A test system according to claim 1, wherein the device under test is further configured to provide an audio signal through an audio output and the recording means of the test system is further configured to record the audio signal provided through the audio output, wherein the playback means outputs the recorded audio signal in synchronicity with the video signal.

3. A test system according to claim 1, wherein the playback means comprises a search feature configured to allow a user to perform a text search on the test script, wherein the playback means on finding a result is adapted to display the section of the test script in the script window and synchronize other windows to the result.

4. A test system according to claim 1, wherein the graphical user interface comprises a user input configured to allow a user to select a time location in the recorded video signal and wherein the playback means is adapted to synchronize the output in each window to that time location.

5. A test system according to claim 3, further comprising an optical character recognition tool configured to analyze frames of the recorded video signal for text and wherein the text search is configured to be performed on the text recognized within the frames.

6. A test system according to claim 1, further comprising a capture means for capturing an image of content of the windows in response to a user input.

7. A test system according to claim 1, wherein the playback means further allows a user to alter the speed of playback.

8. A test system according to claim 7, further comprising the playback means increases or decreases the speed of playback in multiples of 2.

9. A computer-implemented method for testing a device providing a video output for a television, comprising:
   connecting to a device under test that is configured to provide a video signal through a device output for a television and which comprises a device input configured to allow control of the device under test by a user; and
   testing the device under test comprising:
   providing a testing output from a controller configured to provide instructions to the device input of the device under test;
   storing a test script comprising a sequence of test elements that each comprise at least one instruction that is configured to be sent to the device under test and an expected result that is expected to be received from the device under test in response to the at least one instruction;
   recording the video signal provided through the device output, wherein the controller is configured to execute the test script and time stamp each test element of the script upon execution;
   playing back the test script in a script window of a graphical user interface and simultaneously playing back the recorded video signal in a video window, wherein the playback of the video signal and the test script are synchronized;
   producing a test log, the log identifying the result of each test element within the test script; and
   playing back the test log in a third window, wherein the playback of the test log is synchronized with the recorded video signal and playing back of the test script.

10. A method according to claim 9, further comprising:
    providing an audio signal from the device under test through an audio output;
    recording the audio signal provided through the audio output by the controller; and
    outputting the recorded audio signal in synchronicity with the video signal.

11. A method according to claim 9, further comprising:
    providing a search feature to allow a user to perform a text search on the test script; and
    on finding a result, displaying the section of the test script in the script window and synchronize other windows to the result.

12. A method according to claim 9, further comprising:
    allowing a user through a graphical user interface to select a time location in the recorded video signal; and
    synchronizing the output in each window to that time location.

13. A method according to claim 11, further comprising:
    providing an optical character recognition tool analyzing frames of the recorded video signal for text,
    wherein the search feature is configured to be performed on the text recognized within the frames.

14. A method according to claim 9, further comprising:
    capturing an image of content of the windows in response to a user input.

15. A method according to claim 9, further comprising:
    providing a control allowing a user to alter the speed of playback.

16. A method according to claim 15, wherein the control allows the user to increase or decrease the speed of playback in multiples of 2.

17. A computer-implemented test system for testing a device providing a video output for a television, comprising:
    a device under test configured to provide a video signal through a device output for a television and comprising a device input configured to allow control of the device under test by a user; and a test system comprising:

a controller, a testing output from the controller configured to provide instructions to the device input of the device under test, a memory configured to store a test script comprising a sequence of test elements that each comprise at least one instruction that is configured to be sent to the device under test and an expected result that is expected to be received from the device under test in response to the at least one instruction, a recording means for recording the video signal provided through the device output, wherein the controller is configured to execute the test script and time stamp each test element of the script upon execution, playback means for playing back the test script in a script window of a graphical user interface and simultaneously playing back the recorded video signal in a video window, wherein the playback of the video signal and the test script are synchronized and wherein the playback means comprises a search feature configured to allow a user to perform a text search on the test script, wherein the playback means on finding a result is adapted to display the section of the test script in the script window and synchronize other windows to the result.

18. A test system according to claim 17, wherein the device under test is further configured to provide an audio signal through an audio output and the recording means of the test system is further configured to record the audio signal provided through the audio output, wherein the playback means outputs the recorded audio signal in synchronicity with the video signal.

19. A test system according to claim 17, wherein the graphical user interface comprises a user input configured to allow a user to select a time location in the recorded video signal and wherein the playback means is adapted to synchronize the output in each window to that time location.

20. A test system according to claim 17, further comprising a capture means for capturing an image of content of the windows in response to a user input.

* * * * *